United States Patent Office 3,605,965
Patented Sept. 20, 1971

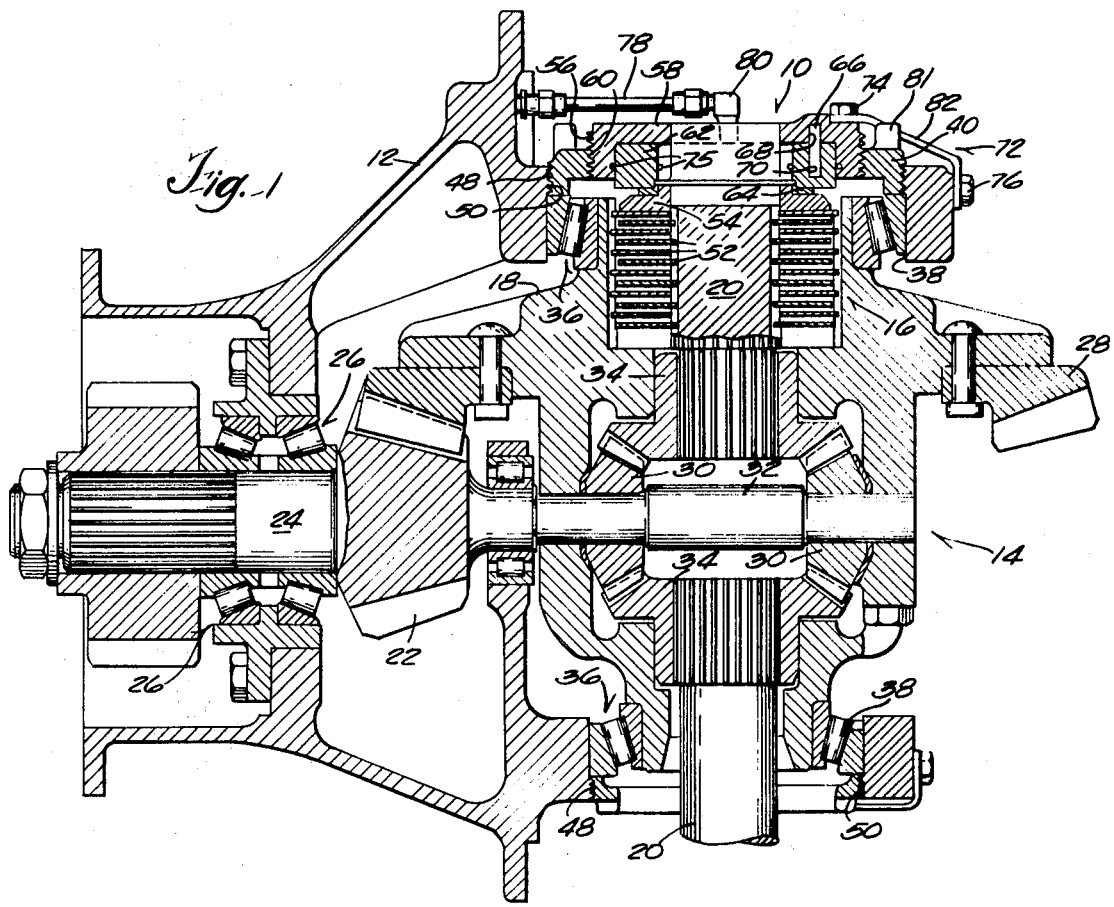

3,605,965
MOUNTING FOR ANNULAR PISTON IN
DIFFERENTIAL LOCKUP ASSEMBLY
David A. Thomas, Clintonville, and Dennis T. Crowe,
Oshkosh, Wis., assignors to FWD Corporation, Clintonville, Wis.
Filed Dec. 29, 1969, Ser. No. 888,777
Int. Cl. F16d 25/06
U.S. Cl. 192—85C2
1 Claim

ABSTRACT OF THE DISCLOSURE

An annular piston and cylinder assembly positioned to apply pressure to the discs of a lockout clutch for a differential gear set with the annular cylinder for the assembly having a screw thread on its outer periphery for mounting in the differential gear housing in a threaded bore concentric with the axis of the clutch and located in a plane normal to the axis of the clutch.

BACKGROUND OF THE INVENTION

A lockout clutch of the type contemplated herein is used in combination with a differential gear set as shown in Pat. No. 3,191,708 to selectively lock the carrier of the differential gear set to one of the output shafts. An annular hydraulic piston and cylinder assembly is used to apply a compressive force to the clutch to lock the interleaved discs together. Accuracy of alignment of the piston and cylinder assembly is essential in this type of a clutch in order to prevent wear of the interleaved discs of the clutch due to the uneven distribution of force on the discs.

As seen in the patent, the piston and cylinder assembly is secured to the housing by bolts located at spaced positions around the periphery of the annular cylinder with shims being used to obtain accuracy of alignment. This mounting arrangement will not provide accuracy of alignment, either as regards concentricity with the clutch or as regards positioning the cylinder in a plane normal to the axis of the clutch, due to the bolting of a cylinder which does not have a flat end to a case which does not have a single machined surface against which the cylinder may rest. Even if a machined surface is provided, bolting the cylinder to the end of the case and in turn bolting the end of the case to the remainder of the case will not provide accurate alignment with the clutch. This mounting arrangement is also difficult to accurately adjust.

SUMMARY OF THE INVENTION

The invention disclosed herein provides accuracy in alignment of an annular hydraulic piston and cylinder assembly with respect to a lockout clutch for a differential gear set. This is accomplished by providing a screw thread on the outer peripheral surface of the annular cylinder for the hydraulic assembly which is threadedly received in a threaded bore of the housing for the differential gear set. Concentricity between the annular cylinder and the clutch is maintained by the continuity of support provided by the screw thread around the outer periphery of the annular cylinder. The screw thread type mounting of the annular cylinder assures that the plane of the annular cylinder will remain normal to the axis of the clutch when adjusted to compensate for variations in the dimensions of the clutch.

Other objects and advantages of the invention will be apparent from the following description when read in connection with the accompanying drawings, in which:

FIG. 1 is a plan view partly in section of a piston and cylinder assembly using the invention and is shown mounted in one of the axle bores of a differential housing.

FIG. 2 is an end view of the invention.

DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to the drawings, an annular piston and cylinder assembly 10 is shown mounted in a housing 12 in a position to engage a lockout clutch 16 for a differential gear set 14. The differential gear set as seen in Pat. No. 3,191,708 conventionally includes a carrier 18, a set of pinion gears 30 journalled on pinion shafts 32 provided in the carrier 18, and a pair of bevel gears 34 splined to output shafts 20. The carrier 18 is supported for rotary motion by roller bearing assemblies 36 provided in axial openings or bores 38 in the housing 12. The differential gear set 14 is driven by a pinion gear 22 provided on a drive shaft 24 mounted in roller bearing assemblies 26 in the housing 12. The pinion gear 22 is positioned to engage a ring gear 28 secured to the carrier 18.

Means are provided to retain the roller bearing assemblies 36 in the bore or openings 38 in the housing 12 in the form of bearing backup nuts 40 having an outer peripheral screw thread 48 threadedly received in a threaded section 50 in the opening 38.

The carrier 18 may be locked to one of the output shafts 20 in the differential gear set 14 by means of the lockout clutch 16 which includes a number of interleaved discs 52 alternately splined to the carrier 18 and to the output shaft 20. An annular follower block 54 is splined to move axially on the output shaft 20 into engagement with the discs 52 for the lockout clutch 16. The follower block 54 is moved axially on the shaft by means of the piston and cylinder assembly 10 to compress the discs 52 and lock the carrier 18 to the output shaft 20.

In accordance with the invention, means are provided to support the hydraulic piston and cylinder assembly 10 in the housing 12 in a concentric position with respect to the lockout clutch 16 and in a plane normal thereto in the form of a screw thread 56 provided on the piston and cylinder assembly 10. More specifically, the assembly 10 includes an annular cylinder 58 having the screw thread 56 on its outer periphery which is threadedly received in an annular screw thread 60 provided on the inner surface of bearing backup nut 40. An annular piston 62 is supported in the annular cylinder 58 for axial movement with respect to the lockout clutch 16 and is positioned to bear on the follower block 54. A bearing washer 64 may be provided between the piston 62 and the block 54. O-ring seals 75 are provided to seal the piston 62 in the cylinder 58. Hydraulic fluid is admitted to the cylinder 58 through a pair of tubular conduits 78 connected to the cylinder 58 by fittings 80 located on diametrically opposite sides of the axis of the cylinder 58. If a bearing backup nut is not provided in the housing, the piston and cylinder assembly 10 may be supported by a screw thread provided on the housing.

The cylinder 58 is prevented from rotating in the backup nut 40 by means of a T-bracket 72 fixedly secured to the cylinder 58 by bolts 74 and to the housing 12 by bolt 76. The piston 62 is also prevented from rotating in the cylinder 58 by means of a pin 66 positioned in recesses 68 and 70 provided in the cylinder and piston, respectively.

The bearing backup nut 40 is also prevented from rotating in the bore 30 of the housing 12 by means of a number of bosses 81 positioned to engage the leg 82 of the T-bracket 72. A plurality of bosses are provided on the bearing backup nut to allow for finer axial adjustment which is required for setting of the roller bearing assemblies 36.

In order to adjust the cylinder 58 with respect to the lockout clutch 16, the cylinder 58 is rotated in the screw threaded section 60 provided in the bearing backup nut 40 to move the cylinder axially with respect to the lockout clutch 16. The cylinder 58 must be rotated through a complete revolution each time an adjustment is to be made since the bolts 74 and the fittings 80 have to be removed from the cylinder and reconnected to the cylinder. The amount of axial movement produced in each revolution of the cylinder will depend on the pitch of the screw threads 56 and 60. The screw thread mounting for the cylinder 58 and the bearing backup nut 40 assures concentricity and alignment of the cylinder with respect to the lockout clutch 16, due to the engagement of the entire outer periphery of the cylinder 58 with the threaded section 60 in the bearing backup nut 40. The threaded section 48 in the axle bore 30 and the threaded section 60 in the bearing backup nut 40 are machined sections which are accurately located with respect to the axis of the bore 30.

What is claimed is:

1. A annular hydraulic piston and cylinder assembly for a lockout clutch positioned in an opening in a differential gear set housing, said assembly including an annular cylinder,
an annular piston positioned in said cylinder for engagement with the lockout clutch,
and means for supporting said cylinder in the housing for axial adjustment concentric with respect to said clutch and in a plane normal to the axis of rotation of said clutch,
said means including a screw thread on the outer periphery of said cylinder,
a supporting screw thread on said housing,
means for securing said cylinder in said housing against rotary motion,
said supporting means including a bearing backup nut,
said backup nut having a number of bosses positioned to engage said securing means.

References Cited
UNITED STATES PATENTS

| | | | |
|---|---|---|---|
| 2,661,826 | 12/1953 | Hendrickson et al. | 192—111B |
| 3,191,708 | 6/1965 | Simonds et al. | 180—44 |

MARK NEWMAN, Primary Examiner

R. HEALD, Assistant Examiner